Oct. 27, 1959  N. EMMONS III  2,909,920
PNEUMATIC GAUGING APPARATUS
Filed Oct. 27, 1954  2 Sheets-Sheet 1
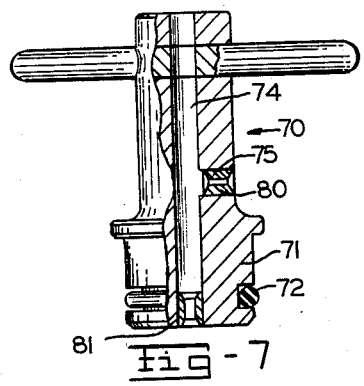
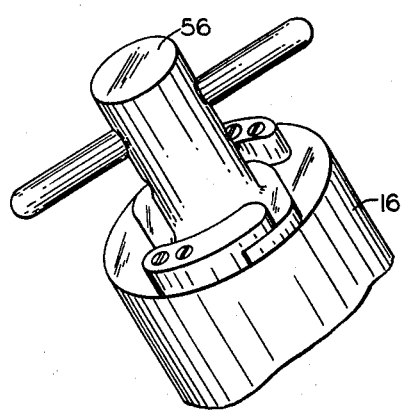
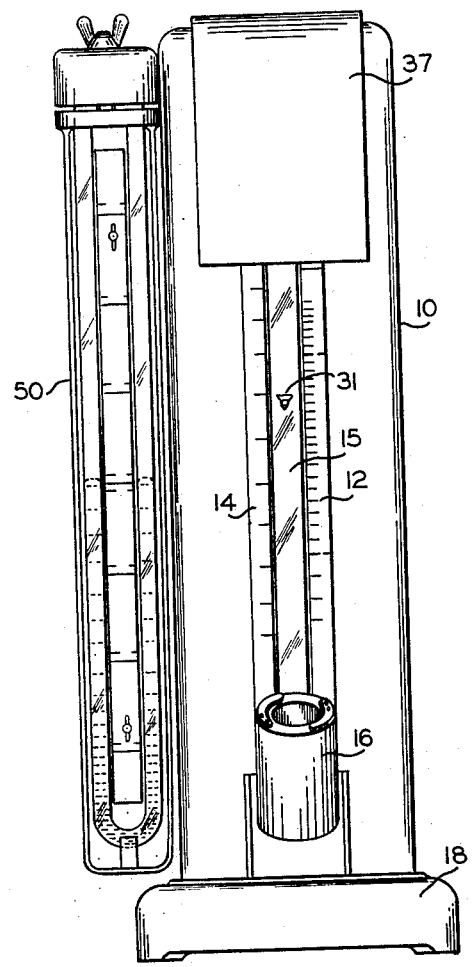
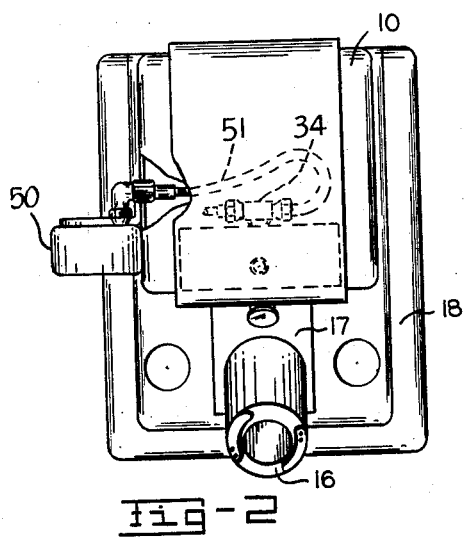
INVENTOR.
Nelson Emmons III
BY Edward J. Noip
atty.

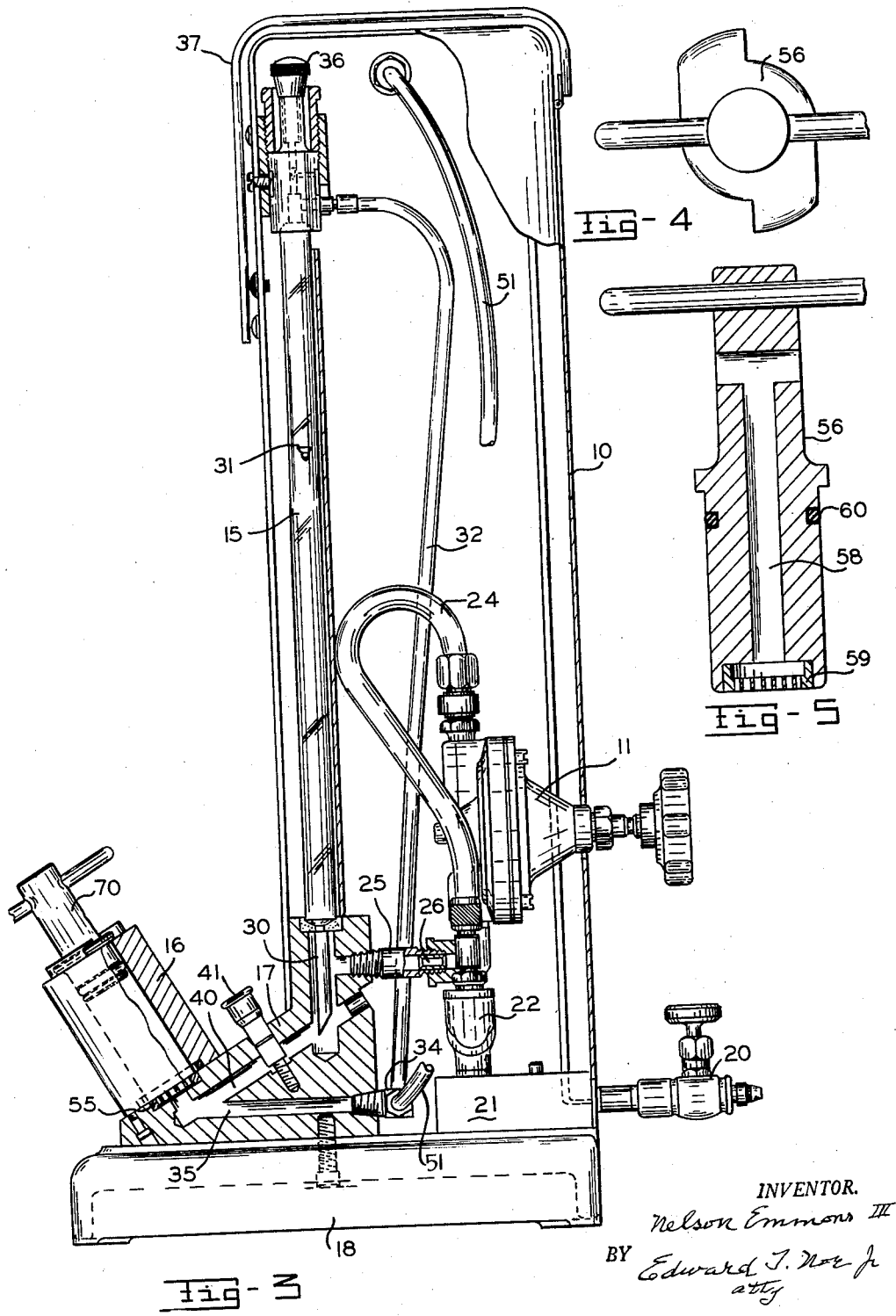

United States Patent Office 2,909,920
Patented Oct. 27, 1959

2,909,920

PNEUMATIC GAUGING APPARATUS

Nelson Emmons III, Dayton, Ohio, assignor, by mesne assignments, to The Sheffield Corporation, a corporation of Delaware Application October 27, 1954, Serial No. 464,961

10 Claims. (Cl. 73—38)

This invention relates to an improved gauging instrument for measuring fiber characteristics by gauging the resistance to air flow of a fibrous mass and to a controllable master for obtaining predetermined flow conditions for calibration purposes and which is particularly useful for setting up such an instrument.

It is an object of this invention to provide an improved gauging instrument of the character referred to wherein air under controlled pressure is passed through a flow responsive indicating means and through a chamber containing the particular fibrous mass to be gauged, there being an adjustable bypass connection between the primary source of fluid and the gauging chamber allowing an adjustment of the amplification of the instrument, all flow passages being short and direct with the major passages being integrally included in a lower unit which includes the receiving chamber and supports the indicating means, whereby friction losses are minimized and the instrument responds quickly and accurately to the fluid flow as controlled by the fibrous mass within the gauging chamber.

It is a further object to provide such an instrument wherein the lower unit includes an inclined fiber receiving chamber facing outwardly and upwardly at the forward face of the instrument for easy insertion and removal of the material to be gauged.

It is a further object to provide an air gauging instrument which is adapted for connection to a source of fluid under controllable pressure and to a product characteristic gauging head, the instrument including rate-of-flow gauging means, a pressure indicator being connected in the gauging circuit between the flow gauging means and the gauging head for obtaining an indication of the gauging pressure during setup allowing accurate adjustment of the instrument for gauging.

It is a further object to provide an instrument responsive to fluid flow as controlled by a gauged product, the instrument comprising a vertically disposed flow indicating tube in a circuit between a source of fluid under controllable pressure and a gauging head, there being provision for connecting a pressure responsive manometer or the like to the gauging circuit upstream of the chamber for sensing and indicating the gauging pressure during setup and gauging.

It is a further object of this invention to provide a master for use in the calibration of instruments of the type responsive to product controlled air leakage, the master being adapted for receiving the flow of gauging air from the instrument and including restrictions of predetermined size through which the flow of gauging fluid can be diverted by the operator to obtain precise flow conditions corresponding to pretermined product characteristics for use in adjusting the instrument and calibrating it for accurate gauging.

It is a further object to provide such a controllable master wherein the gauging flow can be diverted as desired through the provided restrictions by the application of the operator's finger or the like to obtain two precise flow conditions corresponding to product characteristics within the instrument gauging range whereby a single master can be utilized in conjunction with instrument adjustments for accurately calibrating the instrument for gauging.

It is a further object to provide such a master for insertion into the fiber receiving chamber of an instrument for gauging fiber characteristics whereby predetermined flow conditions can be obtained corresponding to two predetermined product conditions within the instrument gauging range with a single master by the simple application of the operator's finger to divert flow through restrictions within the master for use in conjunction with the instrument adjustments for calibration purposes.

Other objects and advantages of the invention will be apparent from the following description, the appended claims, and the accompanying drawing; in which, Figure 1 is a view in elevation of the forward face of an instrument embodying features of the present invention, Figure 2 is a plan view of the instrument with a portion of its housing broken away, Figure 3 is a view in central vertical section disclosing the interior of the instrument and the gauging circuit, Figure 4 is a view of the upper end of a plunger for insertion into the fiber receiving chamber of the instrument to place a fibrous mass under predetermined compression for gauging, Figure 5 is a longitudinal central section of the plunger of Figure 4, Figure 6 is a perspective view of the upper end of the fiber receiving chamber showing the compression plunger claimped in position, and, Figure 7 is a view in partial central section of a controllable master adapted for insertion into the fiber receiving chamber of the illustrated instrument and controllable by application of the operator's finger to divert flow through restrictions as desired to obtain predetermined flow characteristics for calibration purposes.

The instrument illustrated is of the type which measures fiber "fineness" by gauging the resistance to air flow of a predetermined mass of fibers compressed to a given volume. In operating the instrument a predetermined weight of fibers is placed within a receiving chamber in the instrument and compressed to a fixed volume. Air at a given pressure is passed through a rate-of-flow gauge, into the fiber receiving chamber, and through the fibrous mass to atmosphere. The velocity of flow is determined by the characteristics of the fibers being gauged. The "fineness" of the sample is accordingly indicated by the rate-of-flow gauge.

In gauging cotton samples, for example, the instrument is calibrated in terms of micrograms per inch of fiber length. The coarser the fibers in the gauged sample the larger the air flow. The use of the instrument is extremely important in gauging fibrous samples to determine those qualities which affect the quality of finished woven goods, the adaptability of the material to spinning, and like characteristics.

The particular instrument illustrated is one which has both amplification and indicator position adjustments. In setting up such an instrument it is necessary to obtain two predetermined flow conditions through the gauging chamber corresponding to fiber characteristics which differ substantially and lie within the gauging range of the instrument. By conditioning the instrument alternatively to these two flow conditions the interrelated amplification and indicator position adjustments can be made to properly calibrate the instrument response for gauging and to properly correspond with the instrument scale.

A single master or standard is provided through this invention for use in such a calibration procedure. In this particular operation the master is inserted into the fiber receiving chamber in sealed relation to the walls thereof and includes maximum and minimum restrictions in passages leading to atmosphere through which gauging air can be diverted for obtaining the necessary flow conditions.

It is important that gauging be carried out at a predetermined pressure in order that the indicated flow will be accurately responsive to the characteristics of the product gauged. It has been the previous practice in setting-up instruments of the character disclosed to "dead-end" the gauging circuit by inserting a plunger connected to a pressure gauge into the outer end of the fiber receiving chamber and then adjust the pressure source.

Regulated pressure generally drops with increase in rate-of-flow through the regulator and this drop in the pressure to flow curve varies between regulators. Because of this, while a desired pressure is obtained with the circuit "dead-ended" the pressure during actual gauging can vary from that desired so that inaccurate gauging results.

In the present invention provision is made for gauging the pressure at a point in the circuit upstream of the fiber receiving chamber or gauging head. Thus the pressure can be gauged and adjusted for a predetermined flow condition within the gauging range and much more accurate gauging results are obtained. For example, in the particular instrument illustrated the pressure can be gauged and adjusted while a master is inserted in the outer end of the fiber receiving chamber.

While a particular instrument has been illustrated and a master is disclosed adapted for use therewith, it is understood that the teachings of this invention are not necessarily restricted to such a gauging operation nor are the features of the master restricted to use with such an instrument.

The instrument comprises essentially a flow indicating instrument connected to a precision cylinder or chamber for receiving the fibrous mass. The instrument includes a cabinet 10 which encloses a regulator 11 and supports calibrated scales 12 and 14 alongside an indicating flow tube 15 visible at the forward base of the instrument. The fiber receiving chamber 16 is mounted in an inclined position at the forward face of the instrument as part of a lower unit 17 fixed to the upper surface of the instrument base 18. With the chamber so positioned fiber samples are easily inserted and removed.

Seating means are provided on an upper surface of the lower unit 17 for supporting the lower end of the float tube 15. The upper end of the float tube is engaged and clamped by seating means carried from the walls of the cabinet 10.

Air under pressure from a suitable source is supplied for gauging through a valve 20, passages in a block 21, an S-shaped connection 22 and a tube 24 leading to an adjustable pressure regulator 11. Air passes directly from the regulator 11 under regulated pressure through a threaded coupling 25 and into the passages formed integrally in the lower unit 17. This lower unit can be formed in sections including the integrally formed passages. An elongated insert 26 in the coupling 25 serves as a minor restriction to air flow and tends to dampen out fluctuations therein. It will be noted that the regulator 11 is supported from the lower unit 17 by the coupling 25 and that the regulated pressure is supplied through passages of minimum length to the gauging components in order to reduce friction loss and minimize variance in pressure. From the coupling 25 the major portion of the supplied air passes through the passages of the lower unit 17, upward through a tube 30 and upwardly along an internally tapered passage within a transparent indicating tube 15. The passage within the tube 15 is positioned with the larger end upward and a light metal float 31 positions itself along the length of this passage in accordance with the velocity of flow along the indicating tube 15. Flow from the upper end of the flow tube 15 passes through a conduit 32, a coupling 34, a passage 35 in lower unit 17, and to the chamber 16.

A knurled knob 36 at the upper end of the cabinet 10 serves to adjust the amount of air flow relieved directly to atmosphere at the upper end of the flow tube 15. This adjustment 36 is accessible by raising a hinged lid 37 and serves to position the indicating float 31 as desired along the length of the tube 15 in setup.

A passage 40 formed in the lower unit 17 serves to by-pass supplied air directly to the gauging chamber 16 and an amplification adjustment is provided at 41 to control the proportion of the supplied air by-passed around the indicating tube 15 and directly to the chamber 16. The by-passed air is ineffective to position the indicating float 31.

It is important that the gauging passages be formed as directly and unrestricted as possible in order to minimize frictional losses which might affect the gauging indication. The lower unit 17, while illustrated as being formed integrally, could be formed as segmental units clamped together. It will be appreciated that with the passages integrally formed numerous conduit and coupling elements have been eliminated and the flow through all passages is free and direct for quick response and accurate gauging.

In order to obtain an indication of the gauging pressure during setup, a U-tube manometer 50 has one arm connected through a conduit 51 to the coupling 34. The manometer 50 is supported at the side of the cabinet 10 and is visible at the forward face of the instrument. Through such an arrangement a measurement of the gauging pressure is possible while actual gauging flow takes place through the chamber 16.

Air passes into the gauging chamber 16 from the indicating system through a perforated plate 55. A predetermined weight of the particular fiber to be gauged, such as cotton or the like, is placed within the chamber 16 and a compression plunger 56 is inserted into the chamber and clamped as shown in Figure 6. The plunger 56 has a longitudinal passage 58 leading to atmosphere from a perforated plate 59. The particular fiber gauged is compressed between plates 55 and 59. The resistance to flow through the fibrous mass, the plunger 56, and to atmosphere controls the response of float 31 along tube 15 relative to the indicating scales 12 and 14 which are suitably calibrated. A resilient O ring 60 seated in an annular groove in plunger 56 engages the interior wall of chamber 16 to insure that all gauging air passes upward through plunger 56 to atmosphere.

A single master 70 provided by this invention can be simply applied in order to obtain two precise flow conditions through the chamber 16 corresponding to two predetermined fiber characteristics for setup or calibration purposes. The master includes a plurality of passages which can be selectively closed by the operator's fingers to obtain maximum and minimum flow conditions. Thus the disconnecting of parts and use of valves is not required. Such a master has many applications in connection with air type gauging and is not limited to application in fiber fineness checking. This master is used in conjunction with the amplification adjustment 41, the indicator positioning adjustment 36 and the adjustable regulator 11 in setting up the instrument for accurate gaging. Referring particularly to Figure 7 it will be seen that the master 70 includes a lower portion 71 for insertion into chamber 16 (see Figure 3). An annular O ring 72 serves to seal this portion 71 with respect to the chamber wall and to insure that all air passes upward through the passages of the master. The master includes a longitudinal passage 74 having a lower supply portion and an upper discharge portion. A lateral portion 75 also discharges to atmosphere. A restrictor 80 in passage portion 75 offers a predetermined maximum restriction to flow. A larger restrictor 81 in the lower supply portion of passage 74 offers a minimum restriction to flow.

When the master 70 is inserted into chamber 16 the flow through the instrument and chamber to atmosphere is controlled by the restrictions within the master. With both discharge openings free, a predetermined maximum flow condition will occur as determined by the minimum restriction 81. The operator by placing his finger over the discharge end of longitudinal passage 74 can direct all flow through the maximum restriction 80 and a predetermined minimum flow will take place.

As a first step in setting up the instrument for gauging the master 70 is inserted into chamber 16 with its discharge passages free. At such a flow condition the pressure regulator is adjusted to give a predetermined pressure indication on monometer 50. Thus the pressure is adjusted with a flow condition taking place within the range of gauging. This insures accurate and uniform gauging results. Following the pressure adjustment the instrument is adjusted or calibrated for gauging.

Predetermined calibration lines are provided adjacent each end of the scales supported alongside the float tube 15. To calibrate the instrument to the lower calibration line the operator places his finger or thumb over the discharge end of the longitudinal passage 74 thus diverting all air flow through the restrictor 80 and obtaining a predetermined minimum flow condition. The amplification adjustment is then turned to vary the amount of air bypassed through passage 40 directly to gaging chamber 16 to cause the indicating float 31 to position itself at the lower calibration line. The master 70 is not removed from the instrument but the operator removes his finger or thumb and allows the air to flow freely through both the upper and side discharge openings in the master 70, thus placing the orifice or restrictor 81 in control of the air flow and obtaining a predetermined maximum flow condition. At this point the adjustment 41 is utilized to raise the float to approximately just below the upper calibration line. Then the float positioning adjustment 36 is utilized to place the float precisely at the upper calibration line. By successively removing and placing the finger on top of master 70 the interrelated adjustments 41 and 36 can be adjusted until the float 31 arrives precisely at the lower calibration line when the operator's finger closes off the upper end of passage 74 of the master 70 and precisely at the upper calibration line when the flow is free through the master. Concurrently when the flow is free through the master 70 the pressure adjustment can be checked.

While a particular restriction and passage arrangement has been illustrated it will be appreciated that through the teachings of this invention other arrangements can be utilized in a single master and simply controlled to obtain predetermined flow conditions for similar purposes in similar instruments. Through use of such a master as is provided by this invention a plurality of expensively fashioned masters is rendered unnecessary and the calibration procedure can be simply carried out with a single master which is left in position throughout the operation.

After calibration the master 70 is removed, a predetermined weight of the particular fiber to be gauged is inserted into the chamber 16 and compressed by the plunger 56 which is clamped in position. At that time the fiber characteristics will be indicated by the position of float 31 relative to the indicating scales 14 and 12.

It will thus be seen that an instrument has been provided for accurately gauging the characteristics of a fibrous mass; all critical gauging passages have been economically formed as integral passages in a supporting unit. The passages are free and direct and avoid frictional losses which would affect the gauging accuracy. The gauging chamber is positioned in a forwardly inclined position at the forward face of the instrument where the fibrous mass can be easily inserted and removed. Provision has been made for connecting a pressure indicating means at a point upstream of the gauging head or chamber so that the pressure can be adjusted at predetermined flow conditions such as occur in gauging. Through use of the master provided calibration procedures can be carried out with a single master which remains in position and which is utilized in a simple and efficient manner.

While the form of instrument and master herein described constitute preferred embodiments of each, it is to be understood that the invention is not limited to these precise structures, and that changes may be made therein without departing from the scope of the invention which is defined in the appended claims.

What is claimed is:

1. A controllable master for removable insertion into the product receiving chamber of a gauging instrument during set up responsive to air flow through said chamber as determined by a gauged product characteristic, said master comprising a body portion adapted for insertion into said receiving chamber in sealed relationship with the chamber walls, said body portion comprising a passage including a supply portion for receiving fluid flow from said chamber and two discharge portions leading to atmosphere, one of said passage portions having restriction means providing for a minimum air flow corresponding to that for a first predetermined flow condition and a second being substantially unrestricted, the third of said passage portions having further restriction means providing for a different flow than that through said one portion, said one passage portion being one of said discharge portions, whereby by closing off one of the discharge portions of said passage a second predetermined flow condition is obtained.

2. A controllable master for use in calibrating an adjustable gauging instrument responsive to air flow as determined by a gauged product characteristic, said master comprising means providing a passage including a supply portion for receiving air supplied under pressure from said instrument and two discharge portions leading directly to atmosphere, at least one of said discharge portions having a freely accessible end for closure merely by an operator's finger, restriction means in a first of said discharge portions providing for a minimum air flow corresponding to that for a particular flow condition, restriction means in another of said passage portions providing for a substantially greater air flow than through the first discharge portion, the third passage portion being unobstructed, whereby by closing off the second of said discharge portions a predetermined minimum flow condition is obtained so that the instrument can be adjusted for gauging.

3. A controllable master for use in obtaining two predetermined flow conditions in calibrating an adjustable gauging instrument responsive to leakage flow of air as determined by a gauged product characteristic, said master comprising means providing a passage including a supply portion for receiving air under pressure from said instrument and two discharge portions leading directly to atmosphere, restriction means in a first of said discharge portions providing for a minimum air flow corresponding to that for a particular flow condition at one point in the instrument gauging range, restriction means in said supply portion providing for a substantially greater air flow condition therethrough corresponding to that for a particular flow condition at another point in the instrument gauging range, the second discharge portion being unobstructed, whereby with both discharge portions open to atmosphere the flow of air from the instrument is controlled by the restriction means within the supply portion of the passage and by closing off the second discharge portion the flow is controlled by the minimum flow restriction means within the first discharge portion, thus providing two predetermined flow conditions with a single master and allowing adjustment of the instrument for accurate response in subsequent gauging operation.

4. A controllable master for removable insertion into the product receiving chamber of a gauging instrument during set up responsive to air flow through said chamber as determined by a gauged product characteristic, said master comprising a body portion adapted for insertion into said receiving chamber in sealed relationship with the chamber walls, said body portion comprising a passage including a supply portion in communication with said chamber and two discharge portions communicating with the supply passage and leading to atmosphere, restriction means in one of said discharge portions providing for a minimum flow condition corresponding to that of a particular gauged product characteristic, restriction means in the supply portion of the passage providing for a substantially greater air flow condition therethrough corresponding to a particular product characteristic differing from that of the first by a substantial portion of the gauging range of the instrument, the second discharge portion being unobstructed, whereby by closing off the second discharge portion of the passage the total air flow is determined by the restricted first discharge portion and by allowing exhaust through both discharge portions the air flow is controlled by the maximum restriction within the supply passage.

5. A controllable master adapted for removable insertion into the fibre receiving compression chamber during set up of an instrument provided for gauging the characteristics of a fibrous mass in accordance with air flow into the chamber and through the mass, said master comprising a substantially cylindrical body portion, a resilient sealing means around said body portion adjacent one end thereof, adapted for fitting in sealing relation with the compression chamber walls of a gauging instrument, a longitudinal passage through said master for communication with the interior of the chamber, a lateral passage leading from said longitudinal passage through the wall of said body portion, a maximum restrictor in said lateral passage, and a minimum restrictor in said longitudinal passage adjacent one end thereof.

6. An instrument for measuring fiber characteristics as determined by the resistance to air flow of a fibrous mass, said instrument comprising, a base, an internally tapered transparent flow tube, means on said base providing seating means for the lower end of said flow tube, an instrument cabinet carried on said base and including means supporting said flow tube vertically above said seating means with the larger portion of its internal taper upward, an indicating float in said flow tube, passage means leading to the lower end of said flow tube through said seating means and adapted for connection to a source of fluid under controlled pressure, chamber means carried from said base at the forward face of said instrument, a second passage means communicating with the upper end of said flow tube and leading to the lower end of said chamber, a calibration master inserted in the upper end of said chamber including passage means for obtaining a predetermined flow condition through said chamber during instrument calibration, a pressure indicating instrument, and means for establishing communication between the master passage means and the pressure indicating instrument, whereby the fluid pressure in said chamber can be gauged at the flow condition as determined by said master.

7. An instrument for measuring fiber characteristics as determined by the resistance to air flow of a fibrous mass, said instrument comprising, a base, an internally tapered transparent flow tube, means on said base providing seating means for the lower end of said flow tube, an instrument cabinet carried on said base and including means supporting said flow tube vertically above said seating means with the larger portion of its internal taper upward, an indicating float in said flow tube, passage means leading to the lower end of said flow tube through said seating means and adapted for connection to a source of fluid under controlled pressure, means carried from said base at the forward face of the instrument providing a cylindrical chamber, a second passage means communicating with the upper end of said flow tube and leading to the lower end of said chamber, a calibration master inserted into the upper end of said chamber, said master including a cylindrical body portion, sealing means co-operating between said body portion and the wall of said chamber, said body portion having a supply passage communicating with said chamber and a pair of discharge passages leading through said body portion from said supply passage to atmosphere, restriction means in said passages for obtaining a predetermined flow condition through said chamber during instrument calibration, a pressure indicating gauge, and means for establishing communication between the supply passage of the master and the pressure indicating gauge, whereby the fluid pressure in said chamber can be gauged at the flow condition as determined by said master.

8. A gauging instrument for measuring product characteristics in response to the fluid flow through a contained mass of the product gauged, said instrument comprising a base, a lower unit carried from said base having passages formed integrally therein, transparent flow tube having a tapered passage, an indicating float supported in said tube and movable along the length thereof in accordance with the fluid flow therethrough, seating means in the upper surface of said lower unit for receiving the lower end of said tube, cabinet means supporting said tube in vertical position, means providing a cylindrical product receiving chamber at one side of said lower unit, the axis of said chamber being inclined upward and forward at the forward face of the instrument, a first passage means formed integrally in said lower unit communicating with the lower end of said flow tube through said seating means and leading to the lower end of said chamber, a second integral passage means leading through said lower unit and joining said first passage means at a point adjacent said seating means, means at the other end of said second passage means adapted for connection to a source of air under controlled pressure, a third integral passage means within said lower unit joining said first passage means at a point adjacent said chamber, a conduit, means connecting said conduit at one end to the upper end of said flow tube and at its lower end to said third passage means, and an adjustable valve means threaded in said lower unit and in controlling relationship in said first passage means at a point between its intersection with the second and third passage means.

9. An instrument for measuring fiber characteristics through determination of the resistance to air flow of a predetermined fibrous mass, said instrument comprising a base, lower unit supported from said base including means providing a fiber receiving chamber at the forward face of the instrument, the axis of the chamber being inclined upwardly and forward from the instrument base, an internally tapered transparent flow tube, seating means in the upper surface of said lower unit receiving and supporting the lower end of said flow tube, cabinet means mounted on said base including means supporting said flow tube in a vertical position, an indicating float carried in said flow tube and movable along the length thereof, said lower unit including integrally formed passage means, a first of said passage means communicating at one end with the lower end of said flow tube through said seating means, means at the other end of said first passage means adapted for connection to a source of fluid under controlled pressure, a second of said passage means leading through said lower unit and into said fiber receiving chamber at its lower end, conduit means connected to said flow tube at its upper end and leading to said second passage means, a pressure indicator, means connecting said pressure indicator to said conduit for obtaining an indication of the pressure in said chamber, said lower unit including a bypass passage leading from said first passages means to said second passage means, valve means carried in said lower unit and interposed in said bypass passage for controlling the proportion of fluid bypassed directly to the gauging chamber, a plunger, and means for clamping said plunger in said chamber to obtain a predetermined compression of the fibrous mass gauged, said plunger including passage means leading from said chamber to atmosphere.

10. An instrument for measuring fiber characteristics as determined by the resistance to air flow of a fibrous mass, said instrument comprising a base, a chamber on said base, means for supplying air at a constant pressure, a flow gauge in communication with said supplying means having a flow path leading to said chamber, said gauge having adjustable means to provide predetermined upper and lower responses at reference flow conditions through said flow path, calibration means for said gauge including a calibration master connectable to communicate with said flow path, said master including passage means for obtaining said reference flow conditions through said flow path during calibration, a pressure indicator, and conduit means establishing communication between the master passage means and the pressure indicator during calibration.

References Cited in the file of this patent

UNITED STATES PATENTS

| | | |
|---|---|---|
| 1,306,657 | Dezendorf | June 10, 1919 |
| 1,515,746 | Norman | Nov. 18, 1924 |
| 1,982,528 | Mennesson | Nov. 27, 1934 |
| 2,254,259 | Aller | Sept. 2, 1941 |
| 2,266,566 | Poole | Dec. 6, 1941 |
| 2,352,836 | Hertel | July 4, 1944 |
| 2,521,079 | Morris | Sept. 5, 1950 |
| 2,593,957 | Aller | Apr. 22, 1952 |
| 2,706,904 | Hertel | Apr. 26, 1955 |
| 2,790,320 | Salko et al. | Apr. 30, 1957 |

FOREIGN PATENTS

| | | |
|---|---|---|
| 633,842 | Germany | Aug. 7, 1936 |